United States Patent [19]

Omori et al.

[11] 3,909,512

[45] Sept. 30, 1975

[54] SOUND INFORMATION REPRODUCING APPARATUS FOR USE IN A STILL PICTURE BROADCASTING SYSTEM

[75] Inventors: Yoshitaka Omori; Morihiro Kubo, both of Osaka, Japan

[73] Assignee: Sanyo Electric Co., Ltd., Japan

[22] Filed: Oct. 5, 1973

[21] Appl. No.: 403,967

[30] Foreign Application Priority Data

Oct. 6, 1972 Japan .............................. 47-101030

[52] U.S. Cl. ............................ 178/5.6; 178/6.6 DD

[51] Int. Cl.$^2$ ....................... H04N 7/04; H04N 5/78

[58] Field of Search ............ 178/5.6, 6.6 FS, 5.8 R, 178/6.6 DD, DIG. 23; 179/15.55 T; 360/22

[56] References Cited

UNITED STATES PATENTS

| | | | |
|---|---|---|---|
| 3,599,178 | 8/1971 | Jackson et al. | 340/172.5 |
| 3,789,137 | 1/1974 | Newell | 178/6.6 |
| 3,813,484 | 5/1974 | Mino et al. | 178/6.6 FS |
| 3,873,778 | 3/1975 | Mutsuura | 179/15.55 T |

*Primary Examiner*—Robert L. Griffin
*Assistant Examiner*—Mitchell Saffian
*Attorney, Agent, or Firm*—Staas & Halsey

[57] ABSTRACT

A sound information reproducing apparatus for use in a still picture broadcasting system, which comprises auxiliary memory means of small capacity, which is operated in such a way that writing-in the portion of the digitized sound information for description of a related still picture, which sound information is compressed with respect to the time base, and reading-out the contents stored in the auxiliary memory means are performed alternately. These alternate write-in and read-out operations are performed continuously over a frame of sound information, whereby the original sound information is reproduced.

15 Claims, 8 Drawing Figures

SOUND INFORMATION REPRODUCING APPARATUS FOR USE IN A STILL PICTURE BROADCASTING SYSTEM

BACKGROUND OF THE INVENTION

1. Field of the Invention

The present invention relates to a sound information reproducing apparatus for use in a still picture broadcasting system and, more particulary, to a sound information reproducing apparatus in which the capacity of an auxiliary memory for memorizing, or storing, the sound information, which memory is provided in a receiver, can be effectively reduced.

2. State of the Prior Art

A system for broadcasting a plurality of frames of still pictures and the accompanying corresponding sound information is now under development and study.

One proposed system is shown in FIG. 1. In FIG. 1, on the transmitting side, a plurality of frames of still picture information and sound information prepared for description of the respective still pictures are derived from a program source 100, and the informations are recorded on respective tracks of a disc memory device 101. These informations are selectively read out for each frame from the memory device 101 and address codes are fitted to each frame of the still picture information and sound information under the instructions derived from a computer 102.

A video signal representative of each frame of the still pictures and a sound information signal are transmitted to a receiver repeatedly through gate 103 and transmitting circuit 104.

On the other hand, on the receiving side a receiving circuit 200 receives the video and sound information signals, and the address code is correlated with the selection code fed from a keyboard 201 for selecting a desired or necessary frame, of a still picture information and the related sound information, the recording thereof being performed on a smallsized disc memory 202 to repeatedly reproduce the desired or necessary frame on a television set 203.

A problem with such a still picture broadcasting system is how to deal with the sound information siganls.

Generally, one of methods for solving the above problem may be considered wherein an original sound information which is prepared for description of a frame of a still picture is compressed to stand within a period of time corresponding to or equal to the duration of the video signal representative of one frame of the still pictures, and being multiplexed with the video signal with respect to the frequency.

Another proposed method is that one or two frame periods of the video signal are provided for each sound information signal representative of one still picture frame according to a time division system and the sound information signal is placed therein after the time base of the sound information is compressed.

However, these methods have a disadvantage in that an auxiliary memory device of large memory capacity is required in order to store the sound information for compressing or expanding the time base of the sound information, since the ratio of compression or expansion of the time base of the sound information signal to the original sound information must be several hundred.

As is well known, a memory device having a large memory capacity is very expensive, so that the proposed method as described above can not be applied to a receiver of a still picture broadcasting system, which is generally used by consumers.

Accordingly, an essential object of the present invention is to provide a sound information reproducing apparatus for use in a still picture broadcasting system which can employ a memory device of small capacity for expanding the time base of a sound information signal, resulting in reduction of cost of the apparatus.

Another object of the present invention is to provide a sound information reproducing apparatus for a still picture broadcasting system having a pair of auxiliary memory devices of small capacity which alternately function to memorize a portion of the sound information signal at successive, predetermined time intervals, and wherein the read out operation in connection with one memory is performed during a period in which the other memory memorizes another portion of the sound information, succeeding that which has been previously memorized, whereby the entire sound information can be reproduced.

A further object of the present invention is to provide a sound information reproducing apparatus for use in a still picture broadcasting system having one auxiliary memory device of small capacity in which memorization and read-out of the sound information are performed alternately whereby the complete sound information can be reproduced.

These and other objects and features of the present invention will become apparent from the following description taken in conjunction with preferred embodiments thereof with reference to the accompanying drawings, in which;

DETAILED DESCRIPTION OF PREFERRED EMBODIMENTS

Before the description of the embodiments of the present invention proceeds, it is noted that, for the sake of brevity, the preferred embodiments will be described wherein a unit of still picture information signal is composed of one frame of video information signal in the NTSC system, the sound information signal used for description of a still picture being multiplexed by means of the time sharing system wherein the sound information signals are compressed in a period corresponding to one frame which occurs subsequently to the frame of the still picture information signal.

Figure 1:
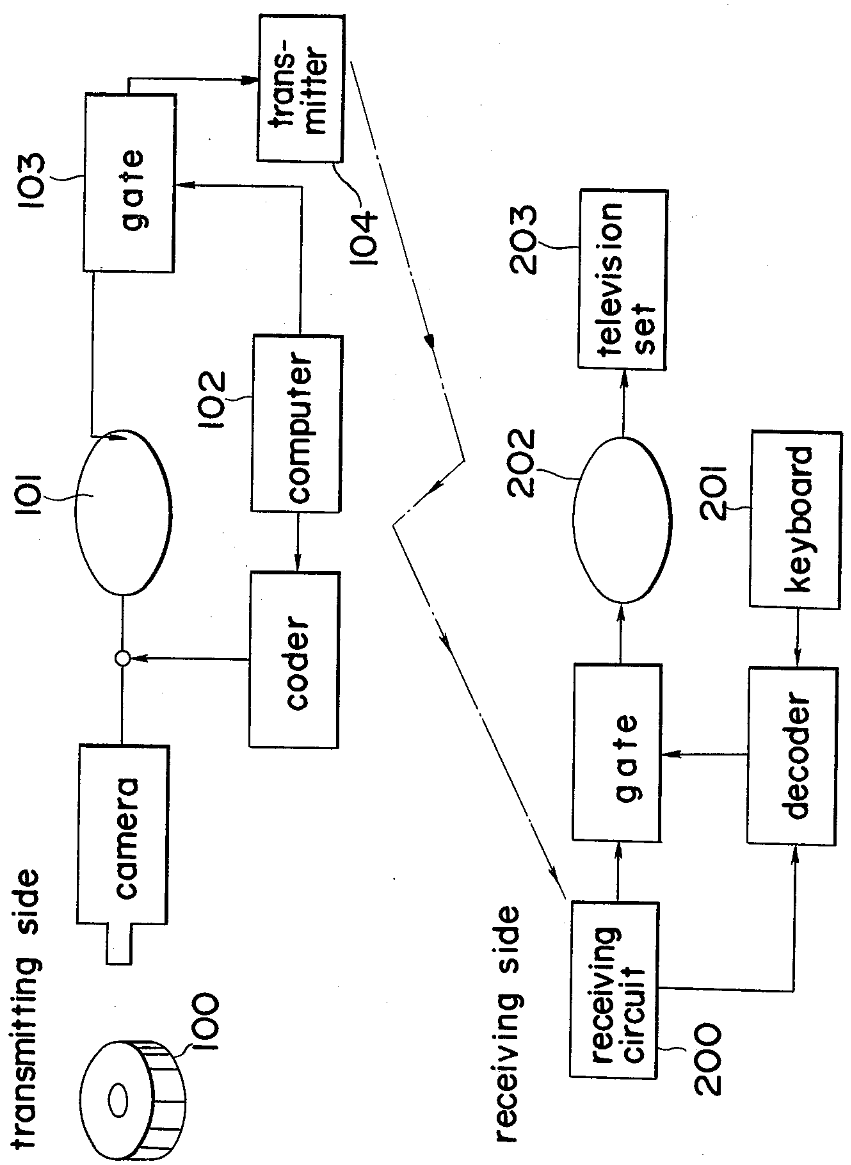
FIG. 1 PRIOR ART
FIG. 1 showns a block diagram of a conventional still picture broadcasting system.
Figure 2:
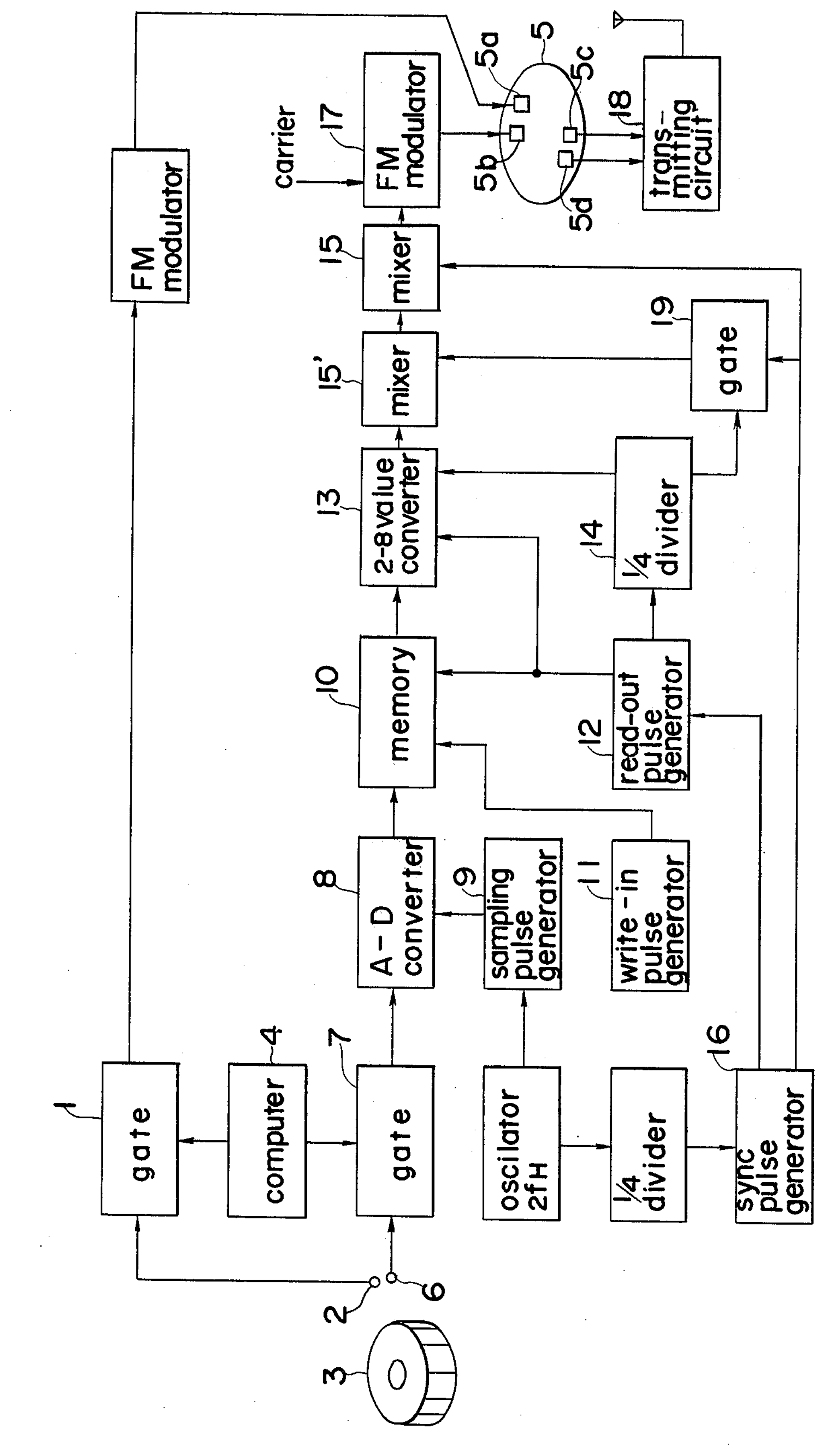
FIG. 2 shows a block diagram of a transmitting apparatus of a still picture broadcasting system employed in association with the present invention.

Referring to FIG. 2, there is provided a gate 1 which receives video signals through an input terminal 2. The video signals are fed from a program source 3 which provides a plurality of frames of still picture information and sound information corresponding to each still picture for description the contents of said picture.

The gate 1 is opened in accordance with directions produced from a computer 4, thereby allowing to pass through an FM modulator to a memory 5 the video signals representative of a whole picture i.e., one frame of the still picture of the program.

The memory 5 is a disc memory device having a rotational spindle which rotates a sheet of magnetic disc at 1,800 R.P.M., said magnetic disc being adapted to be mounted on the rotational spindle and having a plurality of recording tracks coaxial to each other, and heads for recording and/or playing back the signals on each of the tracks.

An audio signal prepared for description of the still picture is applied to a gate 7 through an input terminal 6. The gate 7 is opened during a period of 8.7 seconds by the instructions fed from the computer 4. An output of the gate 7 is applied to an analog-to-digital converter 8 (designated as an A-D converter) which receives sampling pulses of 10.489 $KH_z$ fed from a sampling pulse generator 9.

The frequency of the sampling pulse may be chosen more than twice the highest frequency of the audio signal fed to the input terminal 6. Preferably, in this embodiment, the sampling frequency is two-thirds times the horizontal synchronizing frequency of the video signal.

In the A-D converter 8, the audio signal is sampled each time the sampling pulse is applied to the converter 8, and the audio signal is converted into a binary digital signal having six bits per sampling. The digitized audio signal is hereinafter designated as the sound information signal.

The output of the converter 8 is applied to a memory 10, and is stored therein in response to write-in pulses of 62.9 KHz fed from a write-in pulse generator 11. The memory 10 is composed of, for example, an integrated circuit memory. In order for the sound information signal to be represented by pure binary digits within the six bit framework, the write-in pulse must have a frequency six times the sampling frequency, for example, 10.489 KHz, of the sound information signal.

The sound information signal stored in the memory 10 is read out in response to the read-out pulses of 17.90 MHz, fed from a read-out pulse generator 12. The frequency of the above mentioned read-out pulse is higher than 262.5 times the frequency of the writein pulse and is preferably selected such as to be an integer multiple of the frequency, i.e., 3.58 MHz, of the colour sub-carrier employed in the NTSC system. The sound information stored in the memory 10 thus is read out in sections under control of the 17.90MHz read-out pulses, each section being read-out in a period of time approximately 20 $\mu s$ short of 2H of the horizontal scanning period so that in reproduction, as will be explained, each section may have a duration corresponding to one-thirtieth second of the sound information signal as reproduced. Accordingly, component signals of the sound information signal that have been successively read-out from the memory 10 are in turn applied to the 2–8 value converter 13 at intervals of 2H and spaced by approximately 20 $\mu s$.

In the converter 13, the sound information signal is converted into an octal numbering system. Specifically, the binary digital signals produced by A-D converter 8 and stored in memory 10 are converted to octal digital signals by the 2–8 value converter 13. The sound information signals of octal numbering system stored in the converter 13 are read-out in response to read-out pulses of 4.475 MHz fed from a ¼ divider 14. By determining both frequencies of the write-in pulses and the readout pulses as mentioned above, the audio signal impressed to the terminal 6 for 8.7 seconds, which is necessary time for description of one whole still picture, is arranged into a set of digital signals which occupies one-thirtieth second. In other words, time for sound information is compressed.

The output of the converter 13 is applied to a mixer 15'. This mixer 15' receives a train of pulses of 4.475 MHz fed through the gate 19 and acts to insert some of this train of pulses of 4.475 MHz in the sound information signal between one component signal and another, and thus within the period of time of 20 $\mu s$. The pulses of 4.475 MHz thus inserted in the sound information signal serve as a frame synchronizing signal PFP for the sound information signal.

Supply of the pulse train of 4.475 MHz takes place from the ¼ divider 14 through the gate 19 when the latter is triggered on by a synchronizing pulse from a synchronizing pulse generator 16.

An output signal from the mixer 15' is subsequently applied to a mixer 15 which also receives a series of synchronizing pulses HS from the synchronizing pulse generator 16, the frequency of said synchronizing pulses HS being half the horizontal synchronizing frequency of the video signal.

Figure 3:
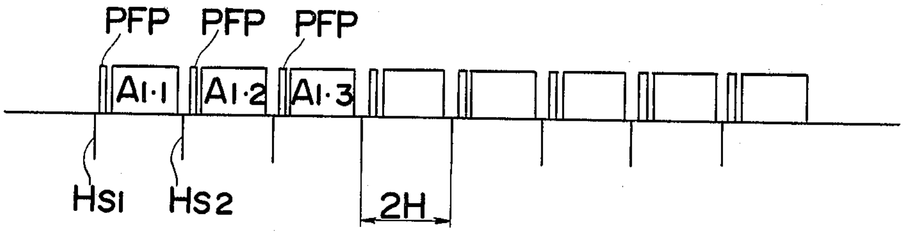
FIG. 3 is a schematic diagram showing the sound information which accompanies synchronizing pulses.

In the mixer 15, the synchronizing pulse HS is fitted to the sound information signals at intervals of twice the horizontal scanning period H of the video signal as shown in FIG. 3.

The output of the mixer 15 is applied to an FM modulator 17 in which a carrier frequency is modulated in accordance with the digital value of the sound information signal.

The output of the FM modulator is applied to a recording head **5*b* of the disc memory 5** and recorded on a predetermined track of the disc.

Other video signals representative of each frame of the picture and audio signals prepared for description of respective pictures provided in the program source 1 are respectively processed and recorded on the corresponding tracks of the disc memory 5 in a similar manner as hereinbefore disclosed.

The frequency modulated video information signal and the sound information signal which are recorded on the tracks of the disc memory 5 are reproduced by reproducing heads **5*c* and 5*d***, respectively.

Figure 4:
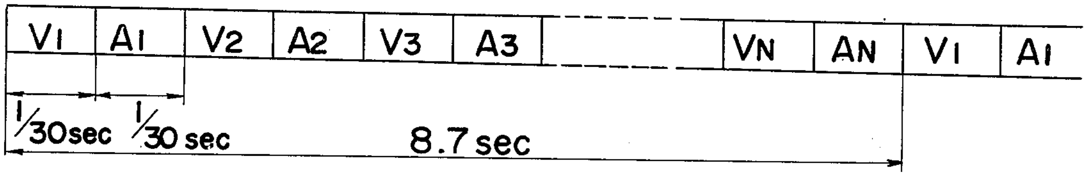
FIG. 4 is a schematic diagram showing the video information and sound information transmitted by the apparatus of FIG. 2.

The outputs of the heads are respectively applied to a transmitting circuit 18 in which each frame of the video signal V1, V2, V3, . . . . Vn and the respectively accompanying sound information signal A1, A2, A3, . . . . An are arranged in series as shown in FIG. 4, and suitable predetermined address codes are fitted to each set of the video and sound information signal V1·A1, V2·A2, V3·A3, . . . . Vn·An, respectively.

After the address codes have been fitted to each set of the video and sound information signals, these signals are transmitted to receivers by the transmitting circuit 18. Each set of the video and sound information signals V1 · A1, to Vn·An is transmitted repeatedly at intervals of 8.7 seconds as shown in FIG. 4.

Figure 6:
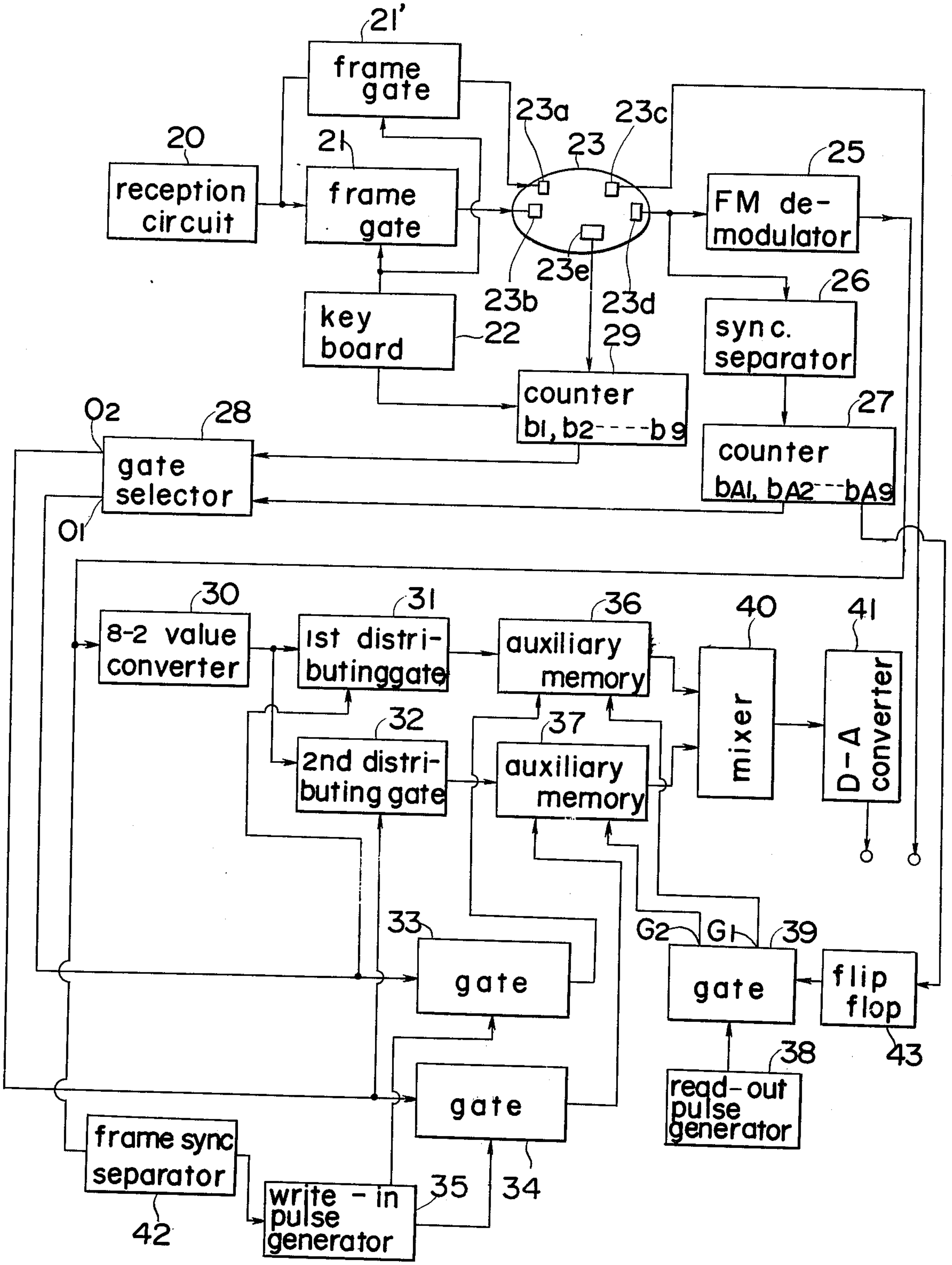
FIG. 6 is a block diagram showing an embodiment of a sound information reproducing apparatus of still picture broadcasting system according to the present invention.

FIG. 6 shows a receiving device according to the present invention.

Referring to FIG. 6, a reception circuit 20 is provided in order to receive the video and sound information signals transmitted by the transmission device shown in FIG. 2. The reception circuit 20 may be constructed in a similar manner as used in a conventional television receiver so far as the circuits beginning from a tuner stage and ending to IF amplifier circuit concerns.

The sound information signal separated from the video signals in the reception circuit 20 is applied to a frame gate 21 which receives an address code produced from a keyboard 22 in which a plurality of manually operable keys for instruction of the code is provided. In the frame gate 21, an address code fitted to a set of the video and sound information signals is compared with another code which is applied from the keyboard 22 and, if coincidence occurs between both codes, the frame gate 21 opens to pass to recording head 23b one frame of the sound information signal which accompanies the address code that has been detected.

The output of the frame gate 21 is applied to a recoding head 23*b* of a disc memory 23, the disk of which rotates at 1800 R.P.M., and the set of the sound information signal is recorded on a predetermined track of the disc memory for one-thirtieth seconds. One complete frame of the sound information signal is recorded on the track in such way as shown in FIG. 5.

Figure 5:
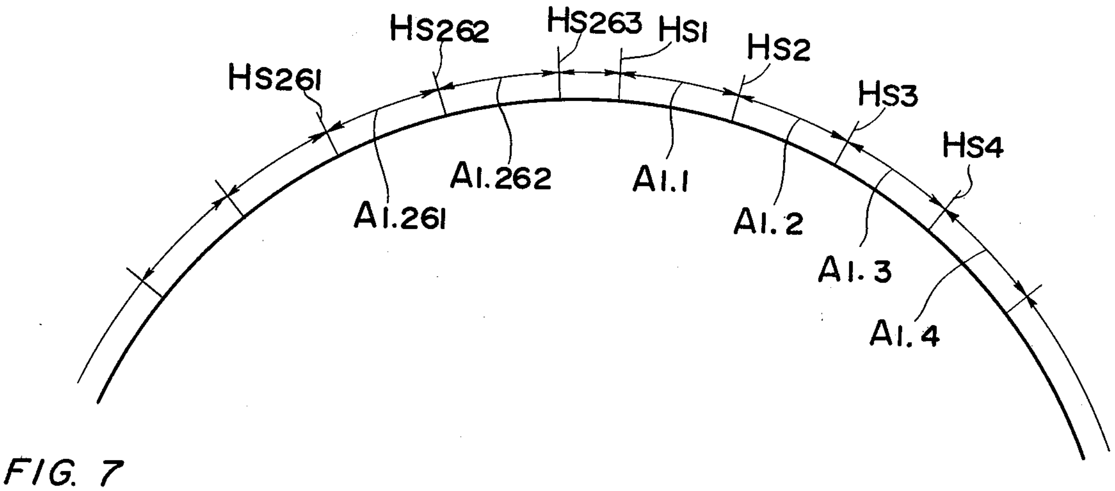
FIG. 5 is a schematic diagram showing sound information recorded on a track of a disc memory.

Referring to FIG. 5, it is understood that a complete frame of the sound information signal is divided into 262 sections A1.1, A1.2, A1.3 . . . . A1.262 each of which sections is separated by corresponding synchronizing pulses HS1, HS2, . . . . Hs263. The length of the interval between each pair of the adjacent synchronizing pulses is equal to twice the horizontal scanning period H of the video signal.

The video signal to which the same address code as that of the sound information signal is fitted is fed out from a gate 21′ in a similar manner as the operation of the gate 21. The video signal thus fed out is recorded on a predetermined track of the disc memory 23 by means of the head 23*a*.

Both video and sound information signals are read out by heads 23*c* and 23*d*, respectively. The output of the head 23*d* is applied to an FM demodulator 25 and a synchronizing signal separator 26. The sound signal is demodulated from a frequency modulated signal to a digital signal of the eight value (octal) system. The sound information signal fed from the FM demodulator 25 is applied to a converter 30 in which the sound information octal digital signal is converted to a binary digital signal. The output of the converter 30 is fed to first and second distributing gates 31 and 32.

On the other hand, the synchronizing pulses HS1, HS2 and so on are fed from the sync. separator 26 to a counter 27 of the 263 numbering system which has output terminals *b*A1, *b*A2, *b*A3, . . . . *b*A9. The output terminals *b*A1, *b*A2, . . . . *b*A9 produce $2^0$, $2^1$, $2^2$, . . . . $2^8$ outputs, respectively, in response to the count accumulation of the applied synchronizing pulses.

Each output of the counter 27 is applied to a gate selector 28 which produces pulses on output terminals 01 and 02 alternately in response to signals fed from the counter 27 and from another counter 29 of 263 numbering system. The counter 29 receives pulses produced from a rotation detector 23*e* of the disc memory which detects the rotation of the rotational spindle and produces a pulse when the rotational spindle completes one rotation.

Figure 7:
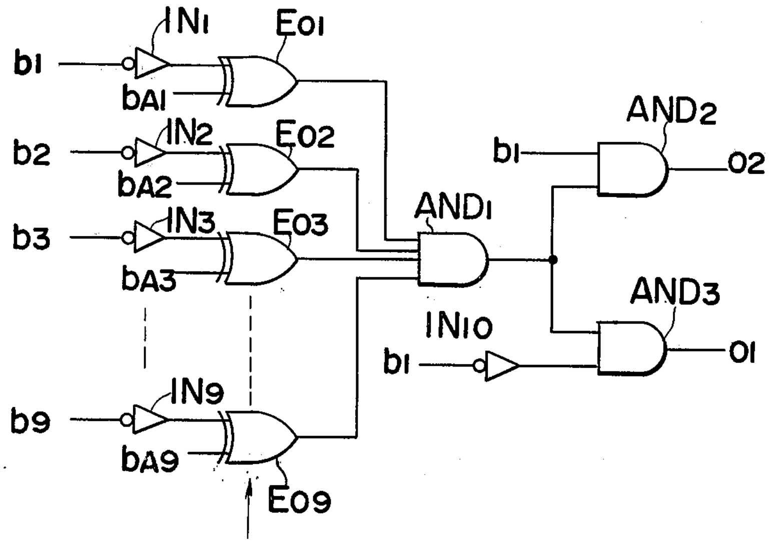
FIG. 7 is a schematic circuit diagram of a gate selector employed in the apparatus of FIG. 6 and, FIG. 8 is a block diagram showing another embodiment of a sound information reproducing apparatus according to the present invention.

FIG. 7 shows details of said gate selector 28. In the FIG. 7, Eo1 through Eo9 denote EXCLUSIVE OR gates, AND1 through AND3 are AND gates. IN1 through IN10 are inverters.

One input terminal of each EXCLUSIVE OR gate Eo1 through Eo9 is connected to a corresponding output terminal b1 through b9 of the counter 29 through the inverters IN1 through IN9 and another input terminal of each EXCLUSIVE OR gate is connected to a corresponding output terminal bA1 through bA9 of the counter 27. The output terminal of each EXCLUSIVE OR gate Eo1 through Eo9 is connected to the AND gate AND1 of which the output terminal is connected to input terminals of the AND gates AND2 and AND3. The AND gate AND2 receives the output b1 of the counter 27. The AND gate AND3 receives the inverse of output b1, as supplied through the inverter IN10.

In this arrangement, during a period in which the head 23*d* traces a section A1.1 of the track in the first rotation of the disc, all the EXCLUSIVE OR gates receive both 0 and 1 signals at their respective input terminals, since all output terminals of the counters 27 and 29 are 0, and all EXCLUSIVE OR gates EO1 through EO9 produce 1 outputs. Therefore, the AND gate AND 1 produces 1, and the output of the AND gate AND3 is 1 since the AND gate AND 3 receives 1 from the inverter IN10. While the head 23*d* traces the sections A1.2 through A1.262 in the first roation of the disc, coincidence of two 1 inputs occurs at the input terminals of at least one of the EXCLUSIVE OR gates since during the first revolution, all of *b*1 to *b*9 remain 0 and at least one of *b*A1 to *b*A9 is a 1 whereby the corresponding EXCLUSIVE OR gate output becomes 0. Accordingly, the output of the AND gate AND1 is 0 and the output of the AND gate AND3 disappears. In the second rotation of the disc, no coincidence of two 1 inputs occurs on the input terminals of all the EXCLUSIVE OR gates during a period in which the head 23*d* traces the section A1.2 of the track, since the contents of the counters 27 and 29 become [1], and thus the outputs b1 and bA1 become 1 whereas the remaining outputs *b*2 to *b*9 and *b*A2 to *b*A9 remain 0. Therefore, the AND gate AND1 produces 1.

However, it is noted that, in the second rotation of the disc, the output *b*1=1 and therefore, AND gate AND 2 produces an output 1.

In a similar manner as described above, during a period in which the head 23*d* traces the section A1.*n* of the track in the *n*th rotation of the disc, the AND gate AND1 produces 1 signal, and the output of the AND gates AND2 or AND3, i.e., the output terminals 02 or 01, is alternately produced in accordance with whether the number of complete revolutions of the disc is odd or even.

Referring again to FIG. 6, the output signals produced on the terminals 01 and 02 of gate selector 28 are respectively applied to distributing gates 31 and 32 and write pulse gates 33 and 34, each of which also receives a write pulse of 17.9 $MH_z$ from a write-in pulse generator 35.

Each of distributing gates 31 and 32 opens for (1/30x(525/2)) second in response to the corresponding 01 and 02 output pulses applied thereto from the gate selector 28, thereby to pass one section of the sound information signal, each section thus corresponding to the length of twice the horizontal scanning period H of the video signal.

The outputs of the gates 31 and 32 are applied to first and second auxiliary memories 36 and 37, respectively, each of which is composed of a integrated circuit memory. The sound information signal fed from the distributing gates 31 or 32 is written in the auxiliary memory 36 or 37 in response to the write-in pulse of 17.9 MHz from generator 35, as supplied through gates 33 and 34, respectively.

The output signal from the FM demodulator 25 is applied to a separator 42 for separating the frame synchronizing signal PFP from the output signal thus applied thereto. The frame synchronizing signal PFP thus separated by the separator 42 is applied to the write-in pulse generator 35 wherein the frame synchronizing signal PFP is used to control the bit synchronism and phase synchronism of a pulse to be subsequently applied to the auxiliary memory 36 or 37 through the gates 33 or 34.

The contents stored in the auxiliary memories 36 and 37 are read out in response to the read-out pulses of 62.9 KHz fed from a read-out pulse generator 38 through a gate 39 which is controlled by output of a T-flip flop 43, which output is reversed when the output *b*A9 of the counter 27 disappears, so that the read-out pulse appears at either of the terminals G1 or G2. By determining the frequencies of the write-in pulse and read-out pulse, the sound information signals corresponding to one section of the track is read-out during one-thirtieth seconds.

The sound signals read-out are applied to a digital-to-analogue converter 41 through a mixer 40.

The video signal which is memorized on the track of the disc memory 23 is reproduced by the head 23*c* and fed to a television monitor ( not shown ) which reproduces a frame of image picture according to the video signal.

The operation of the recieving device constructed as hereinbefore described will now be described.

The reception circuit 20 receives each frame of the video signals V1 through Vn and sound information signals A1 through An transmitted from the transmitting circuit 18 in such a manner as shown in FIG. 4.

In the event that an operator of the receiving device would like to reproduce a picture P1 corresponding to the video signal V1 and sound information A1, he operates the suitable keys on the keyboard 22 so as to instruct address code $\alpha 1$ which is equivalent to the address code fitted to the video and sound informations V1 and A1.

The address code $\alpha 1$ is fed to the frame gates 21 and 21', and coincidence between the both codes, i.e. one being the code which is fitted to the video and sound information signals and the other being the code fed from the keyboard, is detected. After the coincidence has been detected, the gates 21 and 21' open for one-thirtieth second, thereby to pass a frame of the video information signal V1 and sound information signal A1 to the recording heads 23*a* and 23*b*, which are subsequently recorded thereby on the predetermined track of the disc memory 23 which rotates 1800 R.P.M.

At the beginning of the reproducing operation, the counters 27 and 29 are respectively reset and the output *b*A1 and *b*1 of each counter 27 and 29 is respectively 0, The sound information signal is reproduced by the head 23*d* and in turn applied to the FM demodulator in which the frequency modulated sound information signal is demodulated in series into digital signal of octal numbering system.

The sound information signal is applied to the octal-to-binary converter 30 and is converted into binary digital signal of six bits. The sound information signal in the binary form is fed to both distributing gates 31 and 32.

On the other hand, 1 signal is produced from the output terminal 01 of the gate selector 28 during a period in which the head 23d traces the first section A1.1 of the track of the disc memory 23 in the first rotation of the disc, since the outputs *b*A1 and *b*1 of the counters 27 and 29, respectively, are 0. Therefore, the first distribution gate 31 opens, thereby to pass the sound information signal to the first auxiliary memory 36 in which said sound information signal is stored. When the head 23d detects a synchronizing pulse HS2 which is fitted at the end portion of the section A1.1, the counter 27 progresses one step, namely the output *b*A1 becomes 1, causing the output on the terminal 01 to disappear thereby to close the first distributing gate 31.

From the foregoing, it can be understood that the first auxiliary memory 36 memorizes one section A1.1 of the sound information signal during (1/30x(525/2)) second in the first rotation of the disc. The content of the counter 29 progresses each time the synchronizing pulse separator produces the synchronizing pulse HS2 through HS263 as the disc rotates.

When the reproducing head 23*d* detects the synchronizing pulse HS263, namely, the disc completes one rotation, the contents of the counter 27 becomes 262.

When the reproducing head 23*d* detects the synchronizing signal HS1 during the second rotation of the disc memory, the counter 27 is zeroed. When the counter 27 is thus zeroed, an output bA9 from this counter 27 that has been a high level signal becomes a low level signal which is in turn applied to a flip-flop 43 thus permitting the output from the flip-flop 43 to be inverted. The inverted output from the flip-flop 43 triggers the gate 39 to pass the readout pulse therethrough via the terminal G1 to the auxiliary memory 36.

After the disc completes one rotation, the detector 23*e* produces a pulse by detecting the start point of the disc, which is applied to the counter 29 causing the counter 29 to progress a step, whereby the output *b*1 becomes 1.

In the second rotation of the disc, the contents stored in the first auxiliary memory 36 are read out for one-thirtieth second in response to read-out pulses of 62.9 $KH_z$ fed from the read-out pulse generator 38 through the gate 39. The interval of the output pulses fed from the first auxiliary memory 36 thus is expanded as compared with the interval of the pulses as they were applied to the input of said first auxiliary memory 36 during the first rotation of the disc. Then, the interval of the pulses fed from the auxiliary memory 36 becomes equal to the interval of the pulses which are sampled from the original sound signal by means of the A-D converter 8.

The sound information signal thus read out is fed to the D-A converter 41 through the mixer 40.

On the other hand, the gate selector 28 produces a 1 signal at the output terminal 02 during a period in which the section A1.2 of the recoding track of the disc memory 23 is traced by the reproducing head 23*d*, since the outputs *b*A1 and *b*1 of the counters 27 and 29 are respectively 1. Accordingly, the second distributing gate 32 opens whereby the sound information signals recorded in the section A1.2 of the track are fed to the second auxiliary memory 37 in response to the write-in pulse fed from the write-in pulse generator 35 through the write-in pulse gate 34. When the synchronizing pulse HS1 is detected in the third rotation of the disc, the gate 39 is changed over by the output of the T-flip flop 43, which output is reversed when the output of *b*A9 of the counter 27 disappears, and the read-out pulse appears at the output terminal G2.

Therefore, the contents stored in the second memory 37 are read-out during one-thirtieth second, and the sound information recorded in the section A1.2 is fed to the D-A converter 41. In a similar manner as hereinbefore described, the sound information signal recorded in a section A1.*j* ( *j*=3, 4, 5, . . . . 262 ) is reproduced by the reproducing head 23*d* and is fed to either of the auxiliary memories 36 and 37 through the converter 30 and distributing gates 31 or 32. The contents stored in the auxiliary memories 36 and 37 thus are read-out alternately and in succession, each for one-thirtieth second, and fed successively to D-A converter 41 thereby. The D-A converter 41 produces an analog signal which is equivalent to the original sound information prepared for description of the still picture P1.

Figure 8:
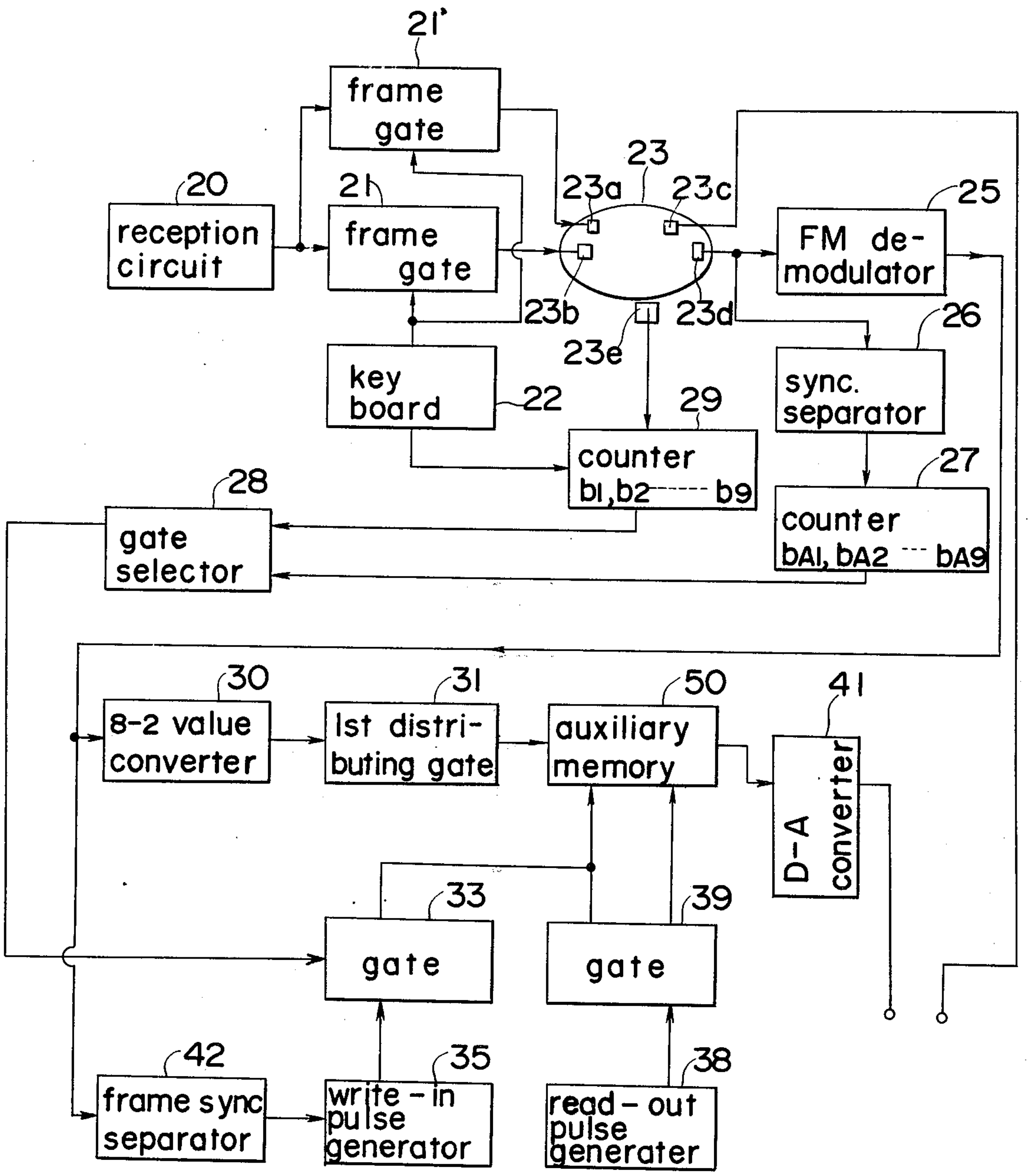

FIG. 8 shows another embodiment of the present invention wherein like parts to those of FIG. 2 are designated by like reference numerals as employed in FIG. 2.

In FIG. 8, one auxiliary memory 50 is provided for storing the sound information signal fed from the converter 30 through the gate 51.

The auxiliary memory 50 stores the sound information signal fed from the gate 31 in response to a write-in pulse during a period in which the reproducing head 23*d* traces a section A1.*j* of the track in the jth rotation of the disc, wherein *j* is an integer except for 0. On the other hand, the sound information signal content stored in the auxiliary memory 50 is read out during a period in which the reproducing head 23*d* traces sections A1.*j* + 1 through A1.*j* − 1 via the start point of the disc.

In this case, since a period (1/30(525/2)) second is required to spend to record in the auxiliary memory 50, the reproduced sound is interrupted for (1/30(525/2)) second only, which latter time interval is required to record each time sound information signal of one-thirtieth second duration, to be reproduced. Accordingly, the fidelity of the sound information signal to be reproduced is reduced slightly, but it may be put into practical use, depending upon the usage.

As described above, the apparatus in accordance with the present invention has an advantage in that an auxiliary memory of very small memory capacity can be used, since the compressed sound information signals recorded in the main memory are supplied piecemeal to the auxiliary memory to expand the time base in the auxiliary memory, by a time period which is equal to the scanning times of the main memory. In the preferred embodiment described above, it is necessary for the first and second auxiliary memories to memorize, or store, sound information of one-thirtieth second duration respectively if the frequency of the sampling is 2f$H_z$, wherein f is maximum frequency of the audio signal to be reproduced. Accordingly, the memory capacity thereof is ((1/30) × 2f).

As the frequency of the audio signal of the sound information prepared for description of the still picture is normally in the neighborhood of 0 to 10 KHz, the capacity of the auxiliary memory may be 1000 or less.

In the description described above, the preferred embodiments have been described by way of example. In the present invention, the frame of still picture information and the sound information used for the description thereof may be multiplexed in a frequency multiplex system, instead of multiplexing the video and sound information in a time division system, when a relatively wide frequency band is available stated generally, the video and related sound information for a given still picture is defined as a field multiplexed to afford 1 + *m* fields, (wherein 1, *m* are integers) including one frame of still picture information and *m* sections sound information. Furthermore, the signals of a PAL and SECAM, etc., as well as the NTSC system may be handled in the similar manner. Also, various memories such as tape or drum, etc. as well as the disc memory may be used for the main memory. In the foregoing description, the description has been made that reproduction of the recorded sound information is carried out by tracing the section A1.1. However, such reproduction may be made with respect to any desired section of the disc memory. Futhermore, although in the foregoing description the time required to explain one particular still picture has been considered 8.7 seconds, it is not always limited thereto and may be variable depending on such factors as the rotational rate of the disc memory, the time allocated to transmission of sound information, and others. Therefore, the present invention should not be limited to the foregoing embodiment, but such changes and modifications, unless otherwise they depart from the true scope of the invention, should be construed as included therein.

What is claimed is:

1. A sound information reproducing apparatus for use in a still picture broadcasting system which repeatedly broadcasts video information signals for n frames of still pictures and corresponding sound information signals respectively relating to and providing a description of the still pictures wherein the time base of the sound information is compressed, and in which a frame of still picture information is composed of *l* fields, each field composed of a predetermined number of lines and the sound information related to each such picture frame is composed of *m* sections, each said sound information section being of a duration substantially equal to an integer multiple of the period of one line of a picture field, the integer being greater than one, and wherein *l*, *m* and *n* are integers, said reproducing apparatus comprising:

gate means for selecting a desired frame of still picture information and the corresponding sound information out of the said n frames of still pictures and corresponding sound information broadcasted, main memory means for receiving and storing the frame of still picture information and the related sound information selected by said gate means in respectively associated, separate storing locations, first auxiliary memory means for receiving and storing one section of the related sound information for a selected frame of still picture information, second auxiliary memory means for receiving and storing a successive section of the said related sound information for the same said selected frame of still picture information, means for scanning said main memory for repeatedly reading out in each of successive, predetermined scanning periods, the video information of the selected frame and the related m sections of sound information for the selected frame as stored in said main memory, means for controlling the first and second auxiliary memory means in each of successive timed periods, each timed period being a fraction $1/m$ of the predetermined scanning period of said main memory, alternately to store in one thereof, at a first rate and during a given one of said successive timed periods, a section of sound information as read out from the main memory, and to read out from the other thereof, at a second, slower rate and during the said predetermined scanning period of said main memory, the section of sound information stored therein in the preceding timed period, thereby to expand the time base of the sound information, as broadcasted and stored in the main memory, for reproduction of the original sound information.

2. A sound information reproducing apparatus for use in a still picture broadcasting system which repeatedly broadcasts video information signals for n frames of still pictures and corresponding sound information signals respectively relating to and providing a description of the still pictures wherein the time base of the sound information is compressed, and in which a frame of still picture information is composed of $l$ fields, each field composed of a predetermined number of lines and the sound information related to each such picture frame is composed of m sections, each said sound information section being of a duration substantially equal to an integer multiple of the period of one line of a picture field, the integer being greater than one, wherein $l$, $m$ and $n$ are integers, said reproducing apparatus comprising:

gate means for selecting a desired frame of still picture information and the corresponding sound information out of the said n frames of still pictures and corresponding sound information broadcasted, main memory means for receiving and storing the frame of still picture information and the related sound information selected by said gate means in respectively associated, separate storing locations, means for scanning said main memory for repeatedly reading out in each of successive, predetermined scanning periods, the video information of the selected frame and the related $m$ sections of sound information for the selected frame as stored, auxiliary memory means for receiving and storing one section of the selected sound information as read out from the main memory, at a first rate and during the time period in which said section of the sound information is scanned in the main memory means, said auxiliary memory means receiving and storing each of the successive sections of sound information in the corresponding time periods of respective, successive ones of said predetermined scanning periods of said main memory, and means for reading out the section of sound information stored in the auxiliary memory means at a second, slower rate and during that portion of the predetermined scanning period of the main memory in which the remaining sections of the sound information stored in the main memory are scanned, for each such stored section of sound information in succession, thereby expanding the time base of the sound information for reproduction of the original sound information.

3. A sound information reproducing apparatus as recited in claim 1 wherein said main memory means comprises a rotatable recording surface having a period of roation corresponding to said predetermined scanning period of said scanning means, and first and second recording heads respectively operable to record a selected frame of still picture information and the corresponding m sections of sound information in respectively corresponding recording paths of said rotatable recording surface, said scanning means comprises first and second scanning heads for reading out the respectively associated still picture information and sound information from the corresponding recording paths, and said controlling means comprises means responsive to each rotation of said rotatable recording surface for accumulating a count corresponding to the number of rotations thereof, means responsive to the scanning by said reading head of said recorded sound information of m sections to identify and accumulate a count corresponding to the scanning of successive ones of said m sections, and gating means responsive to each successive rotation of said recording surface to effect the alternate storage in, and read out from, said first and second auxiliary memory means of each said successive section of sound information read out from said main memory.

4. A sound information reproducing apparatus as recited in claim 3 wherein the sound information is recorded in digital form and wherein each said auxiliary memory comprises a digital memory, said controlling means further comprises write-in and read-out pulse generators for timing the storing and reading out operations of said first and second auxiliary memory means, said write-in pulse generator produces write-in pulses of a rate corresponding to the rate of the digital sound information signals read out by said read-out means from said rotatable memory, said gating means alternately supplying said write-in pulses to said first and second auxiliary memory means in successive time periods thereby to store the successive sections of sound information read out from said main memory alternately in said first and second auxiliary memory means, and said read-out pulse generator produces a train of read-out pulses of a rate sufficient to effect readout of the digital sound signals stored in each said auxiliary memory means within the predetermined scanning period, and said gating means supplies said train of read-out pulses to one of the auxiliary memory means for the predetermined scanning period during which information from the main memory is being stored in the other of said first and second auxiliary memory means.

5. A sound information reproducing apparatus as recited in claim 1 in which each of said n frames of still pictures and corresponding sound information signals is identified by a corresponding address signal and wherein said apparatus further comprises:

an input selection means for identifying the address of a video frame and corresponding sound information selected to be reproduced, and comparison and gating means for identifying the addresses of the received video information signals and corresponding sound information signals for comparison with the address of the selected frame as identified by the input selection means thereby to gate from the received signals of n frames of still picture information and corresponding sound information signals, the selected frame of picture information to be displayed and the respectively corresponding sound information signals for supply to said main memory.

6. A sound information reproducing apparatus as recited in claim 2 wherein said main memory means comprises a rotatable recording surface having a period of rotation corresponding to said predetermined scanning period of said scanning means, and first and second recording heads respectively operable to record a selected frame of still picture information and the corresponding sound information of m sections, in corresponding recording paths of said rotatable recording surface, said scanning means comprises first and second scanning heads for reading out the respectively associated still picture information and sound information from the corresponding recording paths, and said controlling means comprises means responsive to each rotation of said rotatable recording surface for accumulating a count corresponding to the number of rotations thereof, means responsive to the scanning by said reading head of said recorded sound information of m sections to identify and accumulate a count corresponding to the scanning of successive ones of said m sections, and gating means responsive to each successive rotation of said rotatable recording surface to enable said auxiliary memory to store one section of the digital sound information signals read from said main memory during the time interval of read-out of that section and to enable read-out of the section of digital sound information signals previously stored in said auxiliary memory for the remaining portion of the predetermined scanning period of said main memory.

7. A sound information reproducing apparatus as recited in claim 6 wherein the sound information is recorded in digital form and wherein said auxiliary memory comprises a digital memory, said controlling means further comprises write-in and read-out pulse generators for timing the storing and reading out operations of said auxiliary digital memory means, said write-in pulse generator produces write-in pulses of a rate corresponding to the rate of the digital sound information signals read out by said read-out means from said rotatable memory, said read-out pulse generator produces a train of read-out pulses of a rate sufficient to effect read-out of the digital sound signals stored in said auxiliary memory means within the predetermined scanning period, and said gating means supplies said write-in pulses from said write-in pulse generator to said auxiliary memory means during the time interval of reading the section of the sound information from said main memory for recording in said auxiliary memory, and supplies said read-out pulses to said auxiliary memory means for the remaining portion of the predetermined scanning period.

8. A sound information reproducing apparatus as recited in claim 3 in which each of said n frames of still pictures and corresponding sound information signals is identified by a corresponding address signal and wherein said apparatus further comprises:

an input selection means for identifying the address of a video frame and corresponding sound information selected to be reproduced, and comparison and gating means for identifying the addresses of the received video information signals and corresponding sound information signals for comparison with the address of the selected frame as identified by the input selection means thereby to gate from the received signals of n frames of still picture information and corresponding sound information signals, the selected frame of picture information to be displayed and the respectively corresponding sound information signals for supply to said main memory.

9. A sound information reproducing apparatus as recited in claim 1 wherein $l$ has an integer value of 1.

10. A sound information reproducing apparatus as recited in claim 2 wherein $l$ has an integer value of 2.

11. Sound information transmitting and reproducing apparatus of a still picture broadcasting system which repeatedly broadcasts video information signals for n frames of still pictures and corresponding sound information signals providing a description of the respective still pictures wherein the time base of the sound information is compressed and in which a frame of still picture information is composed of $l$ fields and the sound information related to each such picture frame is composed of m sections wherein $l$, $m$ and $n$ are integers, said broadcasted sound information comprising frequency modulated digital values corresponding to digital sample values of the sound information, said apparatus comprising:

gate means for selecting a desired frame of still picture information and the corresponding sound information out of the said n frames of still pictures and corresponding sound information broadcasted, main memory means comprising a rotatable recording surface having a period of rotation synchronized with the time duration of transmission of a frame of still picture information and the corresponding sound information, and first and second recording heads respectively operable to record in respectively associated, separate recording tracks of said recording surface, the video information signals for a given frame of a still picture and the corresponding m sections of sound information for that picture frame, respectively, scanning means comprising first and second scanning heads for reading out the still picture information and the sound information recorded in the respectively associated recording tracks of said rotatable recording surface, said gate means supplying the selected video information and corresponding sound information for a given still picture frame to the corresponding said recording heads and said first and second scanning heads reading out the thus recorded still picture information and sound information from the corresponding recording tracks, means for demodulating the sound information digital values from the broadcasted and selected sound information.

first auxiliary memory means for receiving at a first rate and storing one section of the related sound information digital values for a selected frame of still picture information, second auxiliary memory means for receiving at the same first rate and storing the sound information digital values of a successive section of the sound information for the same said selected frame of still picture information, and controlling means responsive to each rotation of said rotatable recording surface for accumulating a count corresponding to the number of rotations thereof and responsive to the scanning by said reading head for the recorded sound information of m sections, to identify and accumulate a count corresponding to the scanning of successive ones of said m sections, said controlling means being responsive to each successive rotation of said recording surface to effect alternately the storage in and readout from said first and second auxiliary memory means of the sound information, thereby alternately to store in one of said auxiliary memory means the digital values of a section of sound information as read out from the main memory, at said first rate and during the time duration of readout of that said section from the main memory, and to read out from the other of said auxiliary memory means, at a second, slower rate and during the period of rotation of said rotatable recording surface, the section of sound information previously stored in that other auxiliary memory means, thereby to expand the time base of the sound information as broadcasted and as stored in the main memory, and a digital to analog converter for receiving the expanded time base digital values of the sound information as read alternately from said first and second auxiliary means for conversion to an analog signal and reproduction of the original sound information.

12. A sound information transmitting and reproducing apparatus as recited in claim 11, wherein said demodulating means provides sound information digital signals as outputs and there is further provided first and second distributing gates responsive to said controlling means for supplying alternately said successive sections of sound information digital signals to said first and second auxiliary memory means, respectively.

13. A sound information transmitting and reproducing apparatus as recited in claim 11, wherein said transmitting apparatus comprises:

a source of said video information signals and corresponding sound information signals, source gate means, transmitter main memory means comprising a rotatable recording surface having a period of rotation synchronized with the duration of a frame of video still picture information signals and having first and second recording heads, respectively, operable to record in respectively associated, separate recording tracks of said recording surface, the video information signals for a given frame of a still picture and the corresponding m sections of sound information, respectively, and scanning means comprising first and second scanning heads for reading out the still picture information and the sound information recorded in the respectively associated recording tracks, means for selecting sound information signals for a given frame of still pictures and converting said sound information signals to digital values, a transmitter auxiliary memory, said converter means including sampling means operable at a rate of approximately twice the highest video frequency of the sound information signals to provide converted digital values to said transmitter auxiliary memory for storage therein, means for reading out the digital values stored in said transmitter auxiliary memory at a rate substantially greater than the sampling rate of storage therein, and FM modulator means for receiving the digital sound values read out from said memory for supply of FM modulated digital sample values to said corresponding recording head for recording on said transmitter main memory means.

14. A sound information reproducing apparatus for use in a still picture broadcasting system which repeatedly broadcasts video information signals for n frames of still pictures and corresponding sound information signals providing a description of the respective still pictures, wherein the time base of the sound information is compressed, and in which a frame of still picture information is composed of *l* fields each field composed of a predetermined number of lines, and the sound information related to each such picture frame is composed of m sections, each said sound information section being of a duration substantially equal to an integer multiple of the period of one line of a picture field, the integer being greater than 1, and said broadcasted sound information comprising frequency modulated digital values corresponding to digital sample values of the sound information, said reproducing apparatus comprising:

gate means for selecting a desired frame of still picture information and the corresponding sound information out of the said *n* frames of still pictures and corresponding sound information broadcasted, main memory means comprising a rotatable recording surface having a period of rotation corresponding to a frame of still picture information and including first and second recording heads respectively operable to record a selected frame of still picture information and the corresponding sound information of m sections in corresponding recording paths of said rotatable recording surface, means for scanning said main memory including first and second scanning heads for reading out the respectively associated still picture information and sound information from corresponding recording paths, respectively, during each of repeated rotations of the said rotatable recording surface, auxiliary memory means for receiving at a first rate and storing the digital values of one section of the selected sound information as read out from the main memory by said scanning means during that time portion of one period of rotation of said main memory in which said one section of the sound information is scanned, for each sound section in succession during corresponding, successive rotations of said main memory recording surface, and means for reading out the digital values of a section of sound information stored in the auxiliary memory means at a second, slower rate and during the remaining time portion of one period of rotation of the rotatable recording surface of said main memory subsequent to the said time portion in which the said section of sound information was recorded in the said auxiliary memory means, for each said sound section, in succession, thereby expanding the time base of the sound information, and digital to analog converter means for converting the digital values of each section read out from said main memory during each rotation of the rotatable recording surface thereof for conversion of the digital values to an analog signal and reproduction of the original sound information.

15. A sound information transmitting and reproducing apparatus as recited in claim 14, wherein said transmitting apparatus comprises:

a source of said video information signals and corresponding sound information signals, source gate means, transmitter main memory means comprising a rotatable recording surface having a period of rotation synchronized with the duration of a frame of video still picture information signals and having first and second recording heads respectively operable to record in respectively associated, separate recording tracks of said recording surface, the video information signals for a given frame of a still picture and the corresponding m sections of sound information, respectively, and scanning means comprising first and second scanning heads for reading out the still picture information and the sound information recorded in the respectively associated recording tracks, means for selecting sound information signals for a given frame of still pictures and converting said sound information signals to digital values, a transmitter auxiliary memory, said converter means including sampling means operable at a rate of approximately twice the highest video frequency of the sound information signals to provide converted digital values to said transmitter auxiliary memory for storage therein, means for reading out the digital values stored in said transmitter auxiliary memory at a rate substantially greater than the sampling rate of storage therein, and FM modulator means for receiving the digital sound values read out from said memory for supply of FM modulated digital sample values to said corresponding recording head for recording on said transmitter main memory means.

* * * * *